(12) United States Patent
Jiang

(10) Patent No.: US 7,890,691 B2
(45) Date of Patent: Feb. 15, 2011

(54) MEMORY CACHE SHARING IN HYBRID HARD DISK

(75) Inventor: Yong Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 570 days.

(21) Appl. No.: 11/864,791

(22) Filed: Sep. 28, 2007

(65) Prior Publication Data

US 2009/0089500 A1 Apr. 2, 2009

(51) Int. Cl.
*G06F 13/00* (2006.01)
*G06F 13/28* (2006.01)
*G06F 5/00* (2006.01)
*G06G 3/00* (2006.01)

(52) U.S. Cl. ............... 711/103; 711/147; 711/E12.083; 711/113; 710/52

(58) Field of Classification Search .................. 710/52; 711/E12.083
See application file for complete search history.

(56) References Cited

U.S. PATENT DOCUMENTS

| 6,016,530 | A  | * | 1/2000  | Auclair et al. ................. 711/6 |
| 2004/0225835 | A1 | * | 11/2004 | Coulson ..................... 711/114 |
| 2007/0038806 | A1 | * | 2/2007  | Recio et al. ................. 711/113 |
| 2008/0005462 | A1 | * | 1/2008  | Pyeon et al. ................ 711/113 |

* cited by examiner

*Primary Examiner*—Matt Kim
*Assistant Examiner*—Edward J Dudek, Jr.
(74) *Attorney, Agent, or Firm*—Blakely, Sokoloff, Taylor & Zafman LLP

(57) ABSTRACT

A system allows one or more hybrid hard disks or any other storage devices to share a logical nonvolatile device formed by one or more non-volatile memory devices. The system comprises a control logic to reserve on a hybrid hard disk a space that corresponds to a non-volatile memory device in the hybrid hard disk and to use a space access instruction to access the non-volatile memory device. The control logic accesses the logical non-volatile memory device in an event that a content of a storage device is stored in the logical non-volatile memory device in response to an instruction to access the storage device.

15 Claims, 6 Drawing Sheets

MEMORY CACHE SHARING IN HYBRID HARD DISK

BACKGROUND

Hybrid hard disks may integrate non-volatile memory device such as flash memories into the hybrid hard disks to support read or write caching and burst read mode. However, in redundant arrays of independent disks (RAID) environment, integrated non-volatile memory devices may be bundled into individual hybrid hard disk and they may not be utilized by RAID in a more effective way. For example, a first non-volatile memory device in a first hybrid hard disk is isolated from a second non-volatile memory device in second hybrid hard disk and can not be shared by the second hybrid hard disk. A non-volatile memory device may store logical data that may be image of raw data on the hybrid hard disk. Redundancy brought by a RAID system may cause unnecessary redundancy of non-volatile memory devices inside hybrid hard disks. For example, in a RAID 1 or 0+1 implementation, one or more non-volatile memory devices may be wasted. For other multiple hard disk systems, in normal situation, a majority of system loading at a time may be on one hard disk only. In such a situation, non-volatile memory devices on an idle disk may be wasted as well.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques to utilize one or more non-volatile memories in a hybrid hard disk environment. The implementation of the techniques is not restricted in hybrid hard disk environment; it may be used by any execution environments for similar purposes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures and full software instruction sequences have not been shown in detail in order not to obscure the invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

Figure 1:
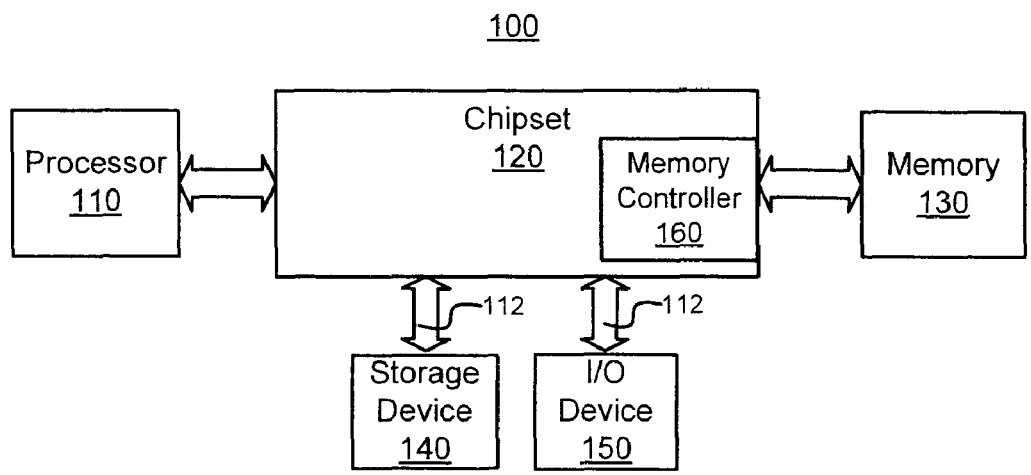
FIG. 1 illustrates an embodiment of a computing device.

An example embodiment of a computing device 100 is shown in FIG. 1. The computing device 100 may comprise one or more processors 110 coupled to a chipset 120. The chipset 120 may comprise one or more integrated circuit packages or chips that couple the processor 110 to system memory 130, storage device 140, and one or more I/O devices 150 such as, for example, mouse, keyboard, video controller, etc. of the computing device 100.

Each processor 110 may be implemented as a single integrated circuit, multiple integrated circuits, or hardware with software routines (e.g., binary translation routines). The processor 110 may perform actions in response to executing instructions. For example, the processor 110 may executes programs, performs data manipulations and control tasks in the computing device 100. The processor 110 may be any type of processor adapted to execute instructions from memory 130, such as a microprocessor, a digital signal processor, a microcontroller, or another processor.

The memory 130 may comprise one or more different types of memory devices such as, for example, dynamic random access memory (DRAM) devices, static random access memory (SRAM) devices, read-only memory (ROM) devices, and/or other volatile or non-volatile memory devices. The memory 130 may store instructions and codes represented by data signals that may be executed by processor 110.

The chipset 120 may comprise a memory controller 160 that may control access to the memory 130. While FIG. 1 illustrates that memory 130 may couple to the processor 110 via the chipset 120, in some embodiments, memory 130 may be coupled to the processor 110 directly and the memory controller 160 may locate in the processor 110. The chipset 120 may further comprise a storage device interface (not shown) that may access the storage device 140. The storage device 140 may comprise a tape, a hard disk drive, a floppy diskette, a compact disk (CD) ROM, a flash memory device, other mass storage devices, magnetic or optic storage media, or any other storage media. The storage device 140 may store information, such as code, programs, files, data, applications, and operating systems. The chipset 120 may further comprise one or more I/O interfaces (not shown) to access the I/O device 160 via buses 112 such as, for example, peripheral component interconnect (PCI) buses, accelerated graphics port (AGP) buses, universal serial bus (USB) buses, low pin count (LPC) buses, and/or other I/O buses.

The I/O device 160 may include any I/O devices to perform I/O functions. Examples of the I/O device 160 may include controller for input devices (e.g., keyboard, mouse, trackball, pointing device), media card (e.g., audio, video, graphics), network card, and any other peripheral controllers.

Figure 2:
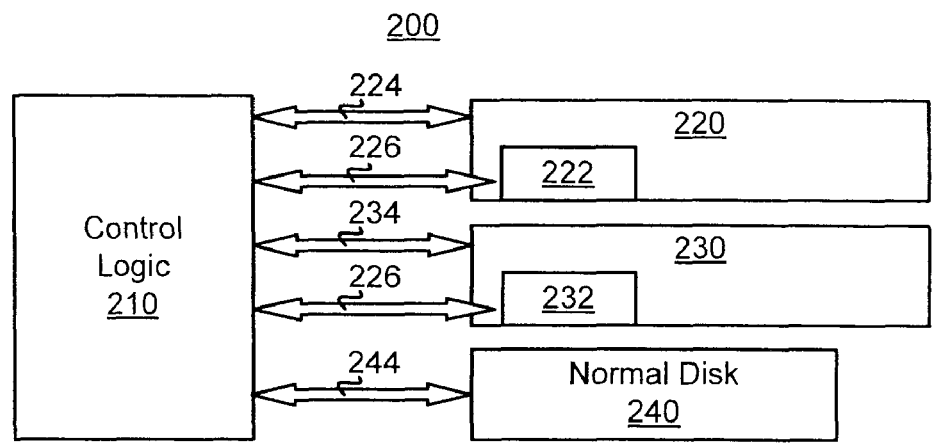
FIG. 2 illustrates an embodiment of a physical view of utilization of non-volatile memories among one or more hard disks.

FIG. 2 illustrates an embodiment to utilize non-volatile memories in a system 200 that may comprise one or more hybrid hard disks. In one embodiment, system 200 may comprise a first hybrid hard disk 220, a second hybrid hard disk 230 and a normal hard disk 240; however, in some embodiments, the system 200 may comprise a different number of hybrid hard disks and normal hard disks or any other storage devices. The first hybrid hard disk 220 may comprise a first flash memory cache 222 and the second hybrid hard disk 230 may comprise a second flash memory cache 232; however, other embodiments may comprise a different number of flash memory caches or any other non-volatile memory devices such as phase change memory (PCM) or battery backed-up static random access memory (SRAM).

Figure 3:
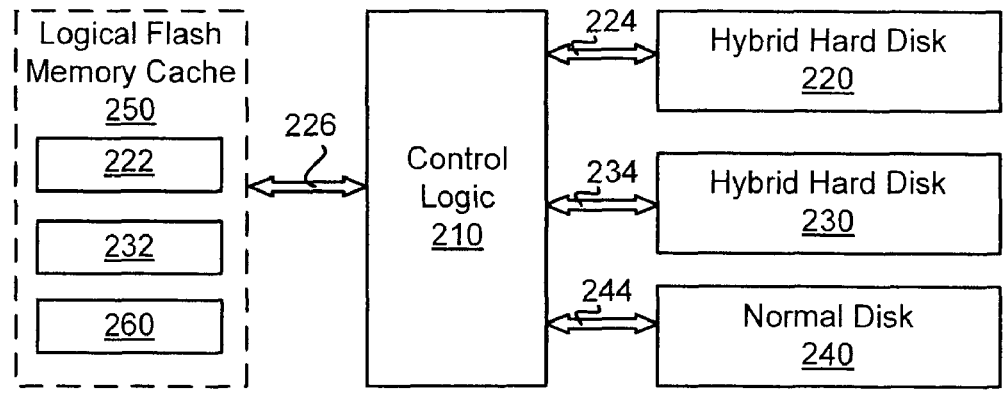
FIG. 3 illustrates an embodiment of a logical view of the utilization of non-volatile memories of FIG. 2.

Referring to FIG. 3, logically, the first flash memory cache 222, the second flash memory cache 232 and a flash memory 260 that may be accessible by the control logic 210 may form a logical flash memory cache 250. The logical flash memory cache 250 may be used to store logical data 226 in the first flash memory cache 222, the second flash memory cache 232, and/or the flash memory cache 260. For example, the flash memory 260 may be physically on the same board where control logic 210 locates; however, in some embodiments, the flash memory 260 may locate at any other place that may be accessed by the control logic 210. While FIG. 4 illustrates the flash memory 260, in some embodiments, any other non-volatile memory devices may be utilized, such as PCM, battery backed-up SRAM.

Figure 4:
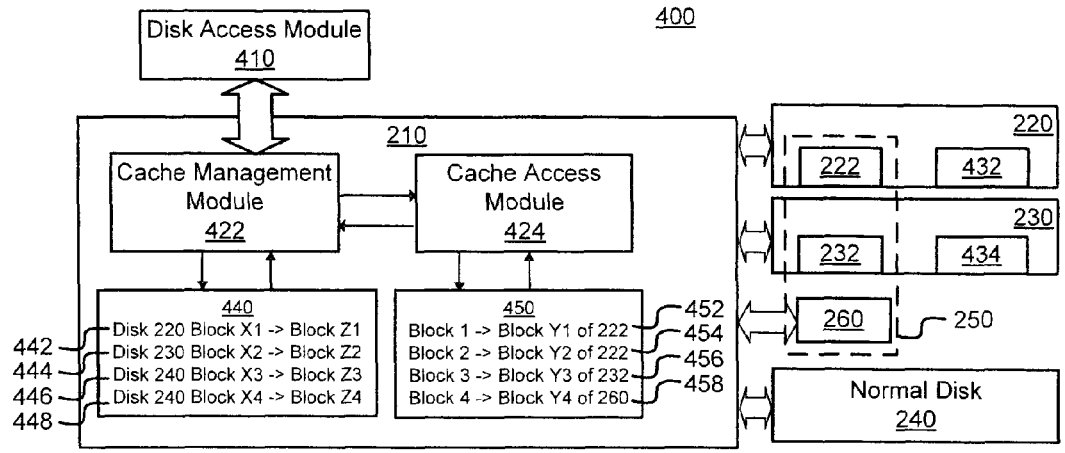
FIG. 4 illustrates an embodiment of a control unit that may control access to one or more hard disks.

FIG. 4 is a block diagram that illustrates an embodiment of control logic 210. In one embodiment, control logic 210 may be coupled with a disk access module 410 to control an access of disk access module 410 to one or more hard disks such as 220, 230 or 240 and one or more non-volatile memory devices such as 250. The disk access module 410 may be coupled to a processor (not shown). In one embodiment, the disk access module 410 may communicate with the control logic 210 to access one or more hard disks such as 220, 230 or 240 and/or one or more non-volatile memory devices such as 250 in response to an instruction from the processor. For example, the disk access module 410 may be provided on a chipset; however, in some embodiments, the disk access module 410 may be implemented in an operating system.

In one embodiment, control logic 210 may reserve a disk space on a hybrid hard disk that may have a size equal to a size of a flash memory cache of the hybrid hard disk. In one embodiment, control logic 210 may pin a block of the disk space to a block of a flash memory cache on the hybrid hard disk. In another embodiment, control logic 210 may use a hard disk interface command or instruction to access the flash memory cache. For example, control logic 210 may generate unmovable system files to reserve the disk space. In another embodiment, control logic 210 may hide the disk space to, e.g., an operating system or a computing device to reserve the disk space. Referring to FIG. 4, in one embodiment, control logic 210 may reserve on the first hybrid hard disk 220 a first disk space 432 that may comprise a first set of one or more blocks. A number of blocks in the first set may equal to a number of blocks of the first flash memory cache 222. Each reserved block in the first set may correspond to a block of the first flash memory cache 222. Similarly, control logic 210 may reserve on the second hybrid hard disk 230 a second disk space 433 that may have a size equal to that of the second flash memory cache 232. Each reserved block on the second hybrid hard disk 230 may correspond to a block of the second flash memory cache 222.

In another embodiment, control logic 210 may access a block of first flash memory cache 220 by an instruction to access a corresponding block of the first reserved space 432. Similarly, control logic 210 may access a block of second flash memory cache 230 by an instruction to access a corresponding block of the second disk space 434. In another embodiment, referring to FIG. 3, control logic 210 may access the first hybrid hard disk 220 except the first disk space 432, the second hybrid hard disk 230 except the second disk space 434 and/or the normal hard disk 240 to read and/or write raw data 224, 234 and/or 244, respectively. In another embodiment, control logic 210 may convert raw data, e.g., 224, 234 and 244 into logical data, such as 226 in response to disk access module 410 requesting for logical data. In one embodiment, control logic 210 may store logical data 226 into one or more blocks of the logical flash memory cache 250. In another embodiment, control logic 210 may access the logical flash memory cache 250 to read and/or write logical data 226. In one embodiment, control logic 210 may use a cache algorithm to allocate a cache block for each hard disk based on utilization. In one embodiment, control logic 210 may convert raw data into logical data that may be the same as the raw data in response to disk access module 410 requesting for raw data.

In logic, the first flash memory cache 222, the second flash memory cache 232 and a flash memory 260 that may be accessible by the control logic 210 may form a logical flash memory cache 250, as shown in FIG. 4. Referring to FIG. 4, a cache mapping table 450 may show correspondence between a cache block of the logical flash memory cache 250 and a block of the first flash memory cache 222, the second flash memory cache 232 or the flash memory 260. Referring to FIG. 4, entry 452 may represent that cache block Z1 of the logical flash memory cache 250 may correspond to block Y1 of the first flash memory cache 222. Entry 454 may represent that cache block Z2 may correspond to block Y2 of the first flash memory cache 222. Entry 456 may represent that cache block Z3 may correspond to block Y3 of the second flash memory cache 232. Entry 458 may represent that cache block Z4 may correspond to block Y4 of the flash memory 260. While FIG. 4 illustrates the cache mapping table 450, in some embodiments, any other mapping relationship may be utilized. In one embodiment, the cache mapping table 450 may be stored in a volatile or non-volatile memory device that may be accessible by the control logic 210. In another embodiment, the cache mapping table 450 may be accessible by the control logic 210 and may be implemented in software such as an operating system, hardware such as in chipset or any other component, or firmware. While FIG. 4 illustrates the cache mapping table 450, in some embodiments, any data structure such as array or list may be utilized.

Referring to FIG. 4, control logic 210 may comprise a cache management module 422 and a cache access module 424. In one embodiment, the cache management module 422 may be coupled with the disk access module 410 and may execute one or more access instruction from the disk access module 410 that may be issued by a processor (not shown) coupled to the disk access module 410. Cache management module 410 may instruct cache access module 424 to access one or more hard disks 220, 230 or 240 and/or the flash memory 260 in response to an access instruction from the disk access module 410. In another embodiment, cache management module 422 may access a cached content table 440. In one embodiment, the cached content table 440 may illustrate content that are cached or stored in a cache block of the logical flash memory cache 250; however, in some embodiments, any data structure such as array or list may be utilized.

For example, as shown in FIG. 4, entry 442 may represent that content of block X1 of the first hybrid hard disk 220 has been stored in block Z1 of the logical flash memory cache 250. In another embodiment, entry 444 may represent that content of block X2 of the second hybrid hard disk 230 has been stored in block Z2 of the logical flash memory cache 250. Entries 446 and 468 may represent that block Z3 and Z4 of the logical flash memory cache 250 comprise content of block X3 and block X4 of the normal hard disk 240, respectively. While FIG. 4 illustrates the cached content table 440, in some embodiments, any other content may be stored in a cache block. In one embodiment, the cached content table 440 may be stored in a volatile or non-volatile memory device that may be accessible by the control logic 210. In another embodiment, the cached content table 440 may be accessible by the control logic 210 and may be implemented in software, e.g., in an operating system, hardware such as in chipset or any other component, or firmware.

Figure 5:
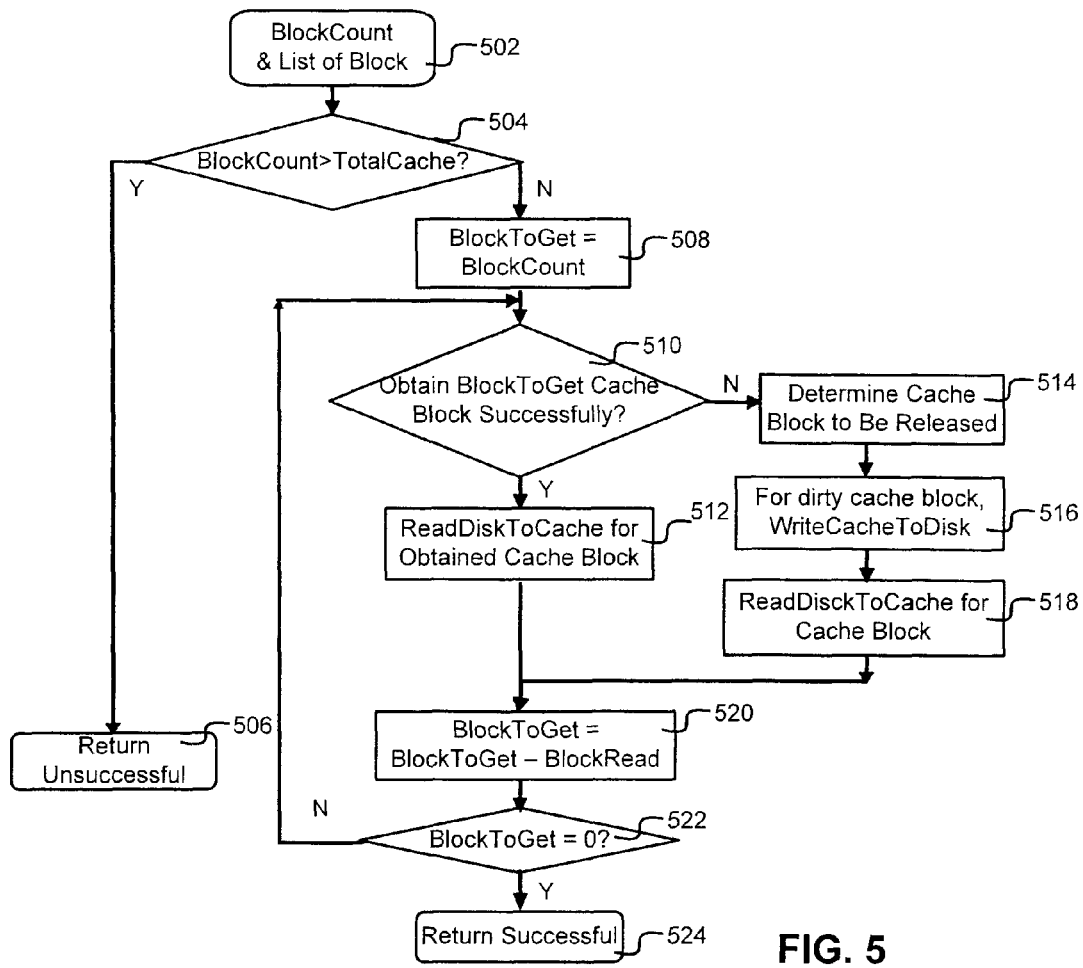
FIG. 5 illustrates an embodiment of a method that may be used to prepare data or any other information from a hard disk to a cache.

Referring to FIG. 5, it is illustrated an embodiment of a method that may be used by cache management module 422 to prepare or read data from the first hybrid hard disk 220, the second hybrid hard disk 230 and the normal hard disk 240 to the logical flash memory cache 250 in background, e.g., based on a PrepareBlock instruction from disk access module 410. In box 502, cache management module 422 may obtain a number (e.g., which may be represented by BlockCount) of a set of one or more disk blocks to be prepared into the logical flash memory cache 250 and a list of the set of blocks from the PrepareBlock instruction. In diamond 504, cache management module 422 may determine if BlockCount is bigger than a number (e.g., which may be represented by TotalCache) of total cache blocks in the logical flash memory cache 250. In response to determining that BlockCount is bigger than Total-Cache, cache management module 422 may return "unsuccessful" or any other indicator such as number or logical value to a processor that has issued the PrepareBlock instruction (box 506). In response to determining that BlockCount is no bigger than TotalCache, cache management module 422 may let a variable, e.g., BlockToGet, equal to BlockCount (box 508). In one embodiment, variable BlockToGet may represent a number of cache blocks that are to be obtained by cache management module 422.

In diamond 510, cache management module 422 may determine if cache access module 422 may successfully obtain BlockToGet cache blocks from the logical flash memory cache 250. If it is determined that the cache access module 422 may successfully obtain BlocktoGet cache blocks from the logical flash memory cache 250, in box 512, cache management module 422 may instruct cache access module 424 to perform a ReadDiskToCache instruction. In response to receiving the ReadDiskToCache instruction, cache access module 424 may read in background content of a disk block from the list obtained in box 502 to a cache block that can be successfully obtained and may clear out a dirty flag that may correspond to the cache block.

In contrast, in response to determining that cache access module 424 fails to obtain BlockToGet cache blocks, cache management module 422 may determine one or more cache blocks to be released in the logical flash memory cache 250 based on a cache replacement algorithm such as least recent used (LRU), most recently used (MRU) or any other cache replacement algorithm (box 514). In one embodiment, cache management module 422 may release a cache block to be released that is not dirty. In another embodiment, in box 516, from the cache blocks determined to be released in box 514, for a cache block that is dirty or whose content is inconsistent with content of a disk block that corresponds to the cache block as shown in cached content table 440, cache management module 422 may transmit, e.g., a WriteCacheToDisk instruction to cache access module 424 to release the dirty cache block. In one embodiment, cache management module 422 may determine that a cache block is dirty based on a dirty flag that may be comprised in the cache block or cached content table 440 or any other data structure. In another embodiment, cache management module 422 may compare content of a cache block and content of a corresponding disk block indicated by cached content table 440 and may determine that the cache block is dirty in response to determining that the two contents are different. In one embodiment, the cache access module 424 may write content of the dirty cache block to the corresponding disk block and may clear out a dirty flag of the dirty cache block in response to the WriteCacheToDisk instruction.

In box 518, cache management module 422 may instruct cache access module 424 (e.g., by a ReadDiskToCache instruction) to read content of a disk block from the list obtained in box 502 to a cache block obtained in box 514 and to clear out a dirty flag that may correspond to the cache block. In another embodiment, cache management module 422 may further update cached content table 440. In box 520, cache management module 422 may let BlockToGet=BlockToGet−a number (e.g., which may be represented by BlockRead) of blocks that have been read in boxes 512 and 518. In diamond 522, cache management module 422 may determine if BlockToGet=0. In box 524, cache management module 422 may return e.g., "successful" to a processor that has issued the PrepareBlock instruction, in response to determining that BlockToGet equals to zero. In contrast, in response to determining that BlockToGet is bigger than zero or does not equal to zero, the flow may return to diamond 510.

Figure 6:
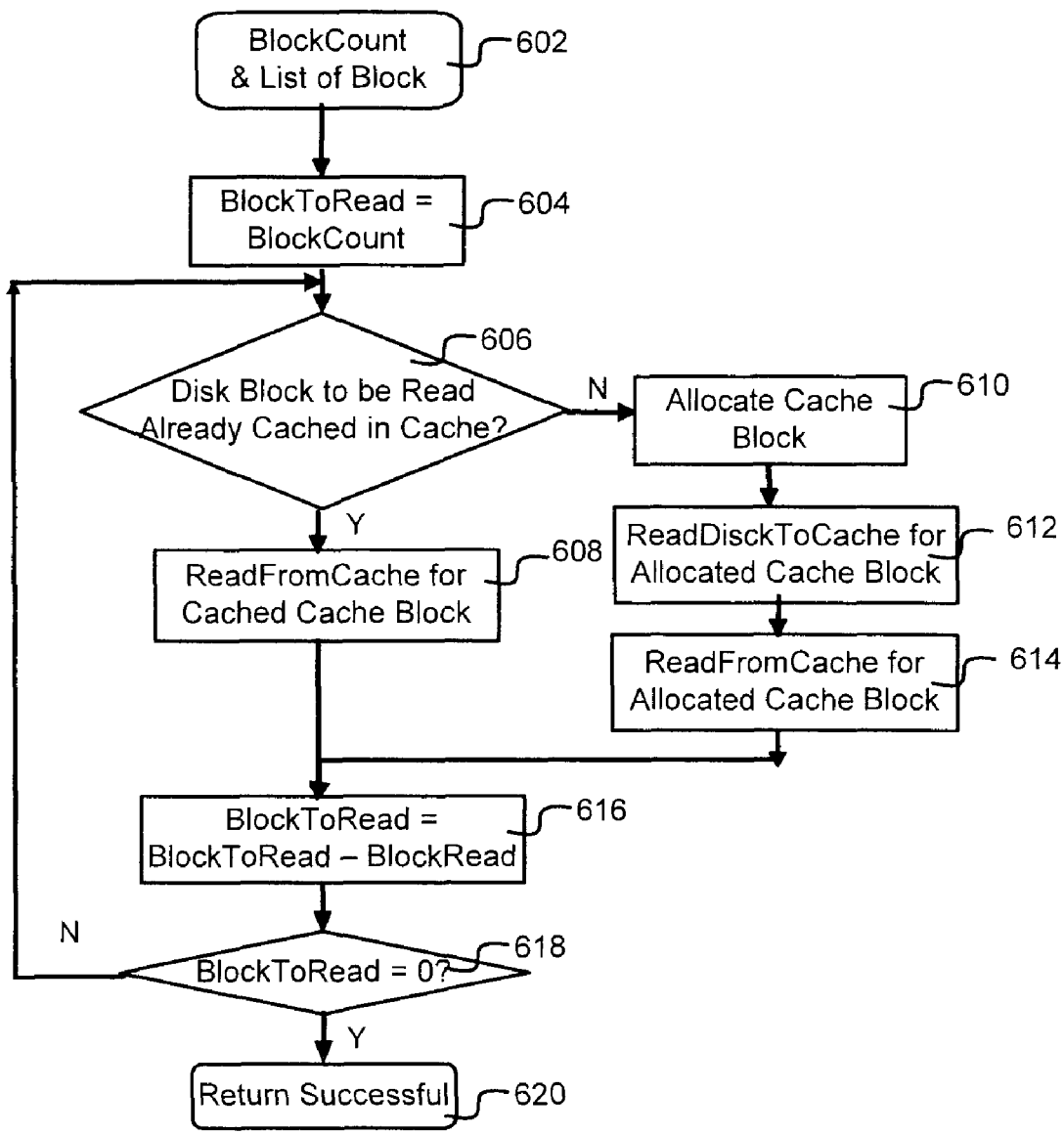
FIG. 6 illustrates an embodiment of a method that may be used to read data or any other information from a hard disk.

Referring to FIG. 6, it is illustrated an embodiment of a method that may be used by cache management module 422 to read data from hard disks 220, 230 and/or 240, e.g., based on a ReadBlock instruction from disk access module 410. In box 602, block management module 422 may obtain a number of disk blocks to be read, e.g., Block Count, and a list of the disk blocks based on the ReadBlock instruction. In box 604, cache management module 422 may let a variable, e.g., BlockToRead, equal to BlockCount. In diamond 606, cache management module 422 may determine if a disk block to be read has already been cached in the logical flash memory cache 250. For example, cache management module 422 may look up a cache block of the logical flash memory cache 250 that has stored content of a disk block to be read in the cached content table 440. In response to determining that the disk block has been cached in the logical flash memory cache 250, e.g., the corresponding cache block has been found, cache management module 422 may instruct (e.g., by a ReadFromCache instruction) cache access module 424 to read content of the cache block and to pass the content to cache management module 422 (box 608). In one embodiment, cache access module 424 may use a direct memory access (DMA) method or any other method to pass the content or a reference to the content to cache management module 422.

In contrast, in response to determining that content of a disk block to be read is not cached or absent in the logical flash memory cache 250, cache management module 422 may allocate a cache block of the logical flash memory cache 250 to the disk block (box 610). In one embodiment, cache management module 422 may allocate a blank cache block to a disk block to be read, e.g., by a cache allocation algorithm. In another embodiment, cache management module 422 may allocate a cache block to be released (e.g., not dirty) to a disk block to be read. In yet another embodiment, for a dirty cache block that is determined to be released, in response to a WriteCacheToDisk instruction from cache management module 422, cache access module 424 may write content of a dirty cache block to a corresponding disk block as indicated by cached content table 440 and may clear out a dirty flag of the cache block to allocate the dirty cache block to a disk block to be read.

In box 612, cache management module 422 may transmit a ReadDiskToCache instruction to cache access module 424 to instruct cache access module 424 to read content of a disk block to be read to a cache block allocated for the disk block in box 610 in background and to clear out a dirty flag of the cache block. In box 614, cache management module 422 may instruct cache access module 424 (e.g., by a ReadFromCache instruction) to read content of a cache block allocated in box 610 and to pass the content or a reference to the content to cache management module 422 by, e.g., a DMA or any other method. The descriptions to boxes 616, 618 and 620 may refer to the descriptions on boxes 520, 522 and 524, respectively.

Figure 7:
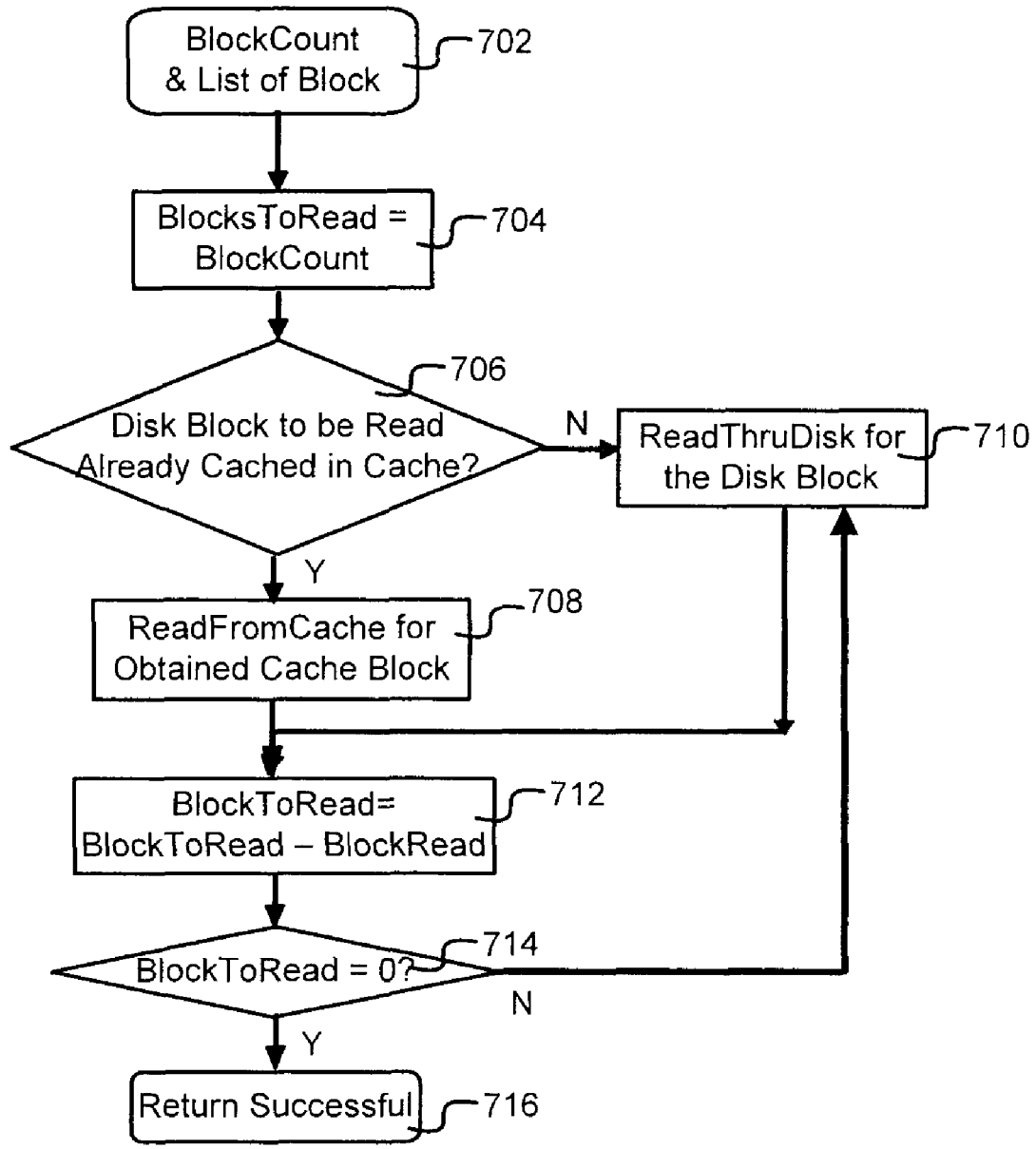
FIG. 7 illustrates an embodiment of a method that may be used to read data or any other information from a hard disk bypassing a cache.

Referring to FIG. 7, it is illustrated an embodiment of a method that may be used by cache management module 422 to read data from hard disks 220, 230 and/or 240 and may bypass the logical flash memory cache 250, e.g., based on a ReadThruBlock instruction from disk access module 410. In box 702, block management module 422 may obtain a number of disk blocks to be read, e.g., Block Count, and a list of the disk blocks from the ReadThruBlock instruction. Description on box 704 may refer to the description on box 604. In diamond 706, cache management module 422 may determine if a disk block to be read is cached in the logical flash memory cache 250 based on cached content table 440. In box 708, in response to determining that the disk block is cached in the logical flash memory cache 250, cache management module 422 may instruct (e.g., by a ReadFromCache instruction) cache access module 424 to read content of a cache block that corresponds to the cached disk block and to pass the content or a reference to the content to the cache management module 422 by a DMA method or any other method. In contrast, in box 710, in response to determining that the disk block is not cached or absent in the logical flash memory cache 250, cache management module 422 may instruct cache access module 424 (e.g., by a ReadThruDisk instruction) to read content from the disk block. In one embodiment, cache access module 424 may bypass the logical flash memory cache 250 to access the disk block directly.

In box 712, cache management module 422 may let BlockToRead=BlockToRead−a number (e.g., which may be represented by BlockRead) of blocks that have been read in boxes 708 and 710. In diamond 714, cache management module 422 may determine if BlockToRead=0. In box 716, cache management module 422 may return e.g., "successful" to a processor that has issued the ReadThruBlock instruction, in response to determining that BlockToRead equals to zero. In contrast, in response to determining that BlockToRead is bigger than zero or does not equal to zero, the flow may return to box 710.

Figure 8:
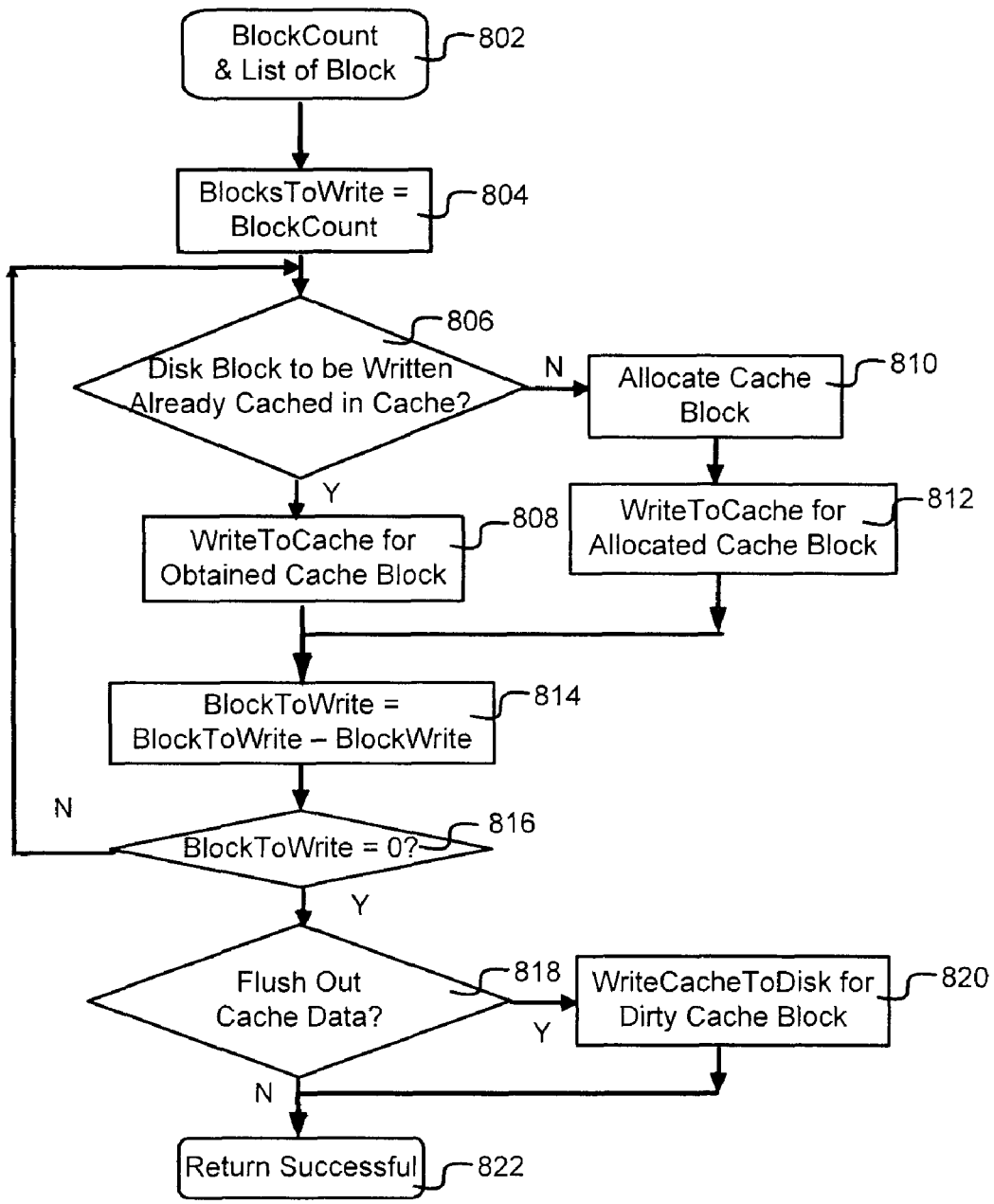
FIG. 8 illustrates an embodiment of a method that may be used to write data or any other information to a hard disk.

FIG. 8 illustrates an embodiment of a method that may be used by cache management module 422 to write data to hard disks 220, 230 and/or 240, e.g., based on a WriteBlock instruction from disk access module 410. In box 802, cache management module 422 may obtain a number (e.g., which may be represented by BlockCount) of a set of one or more blocks to be written to disk blocks and a list of the set of blocks from the WriteBlock instruction. In diamond 804, cache management module 422 may let a variable, e.g., BlockToWrite, equal to BlockCount.

In diamond 806, cache management module 422 may determine if a disk block to be written has already been cached in the logical flash memory cache 250. If it is determined that the disk block is cached in the logical flash memory cache 250, in box 812, cache management module 422 may pass a block of data to be written or a reference of the data such as index, pointer or address to the cache access module 424 and instruct cache access module 424 (e.g., by a WriteToCache instruction) to write the data to a cache block that corresponds to the disk block based on the cached content table 440 and to set a dirty flag of the cache block. In one embodiment, cache access module 424 may use DMA or any other method to write the block of data to the cache block.

In contrast, in response to determining that the disk block is not cached or absent in the logical flash memory cache 250, cache management module 422 may allocate a cache block to the disk block (box 810). A method to allocate a cache block may similar to the description on box 610. In box 812, cache management module 422 may instruct cache access module 424 to write the block of data to be written to a cache block allocated in box 810 and to set a dirty flag of the cache block, e.g., by a WriteToCache instruction. In one embodiment, cache access module 424 may use DMA or any other method to write the block of data to the cache block.

In box 814, cache management module 422 may let BlockToWrite=BlockToWrite−a number (e.g., which may be represented by BlockWrite) of blocks that have been written in boxes 808 and 812. In diamond 816, cache management module 422 may determine if BlockToWrite=0. In response to determining that BlockToWrite is bigger than zero or does not equal to zero, the flow may return to diamond 806. In contrast, in box 818, cache management module 422 may determine if it is to flush out cache data. For example, cache management module 422 may determine if there is any dirty cache block in the logical flash memory cache 250. In box 820, in response to determining that it is to flush out cache data, e.g., a dirty cache block or a dirty flag of a cache block is found, cache management module 422 may instruct cache access module 424 to write content of a cache disk that is written in box 812 or 816 to a correspond disk block, e.g., by a WriteCacheToDisk instruction and to clear out a dirty flag of the cache block. In contrast, in box 822, cache management module 422 may return e.g., "successful" or any other indicator.

Figure 9:
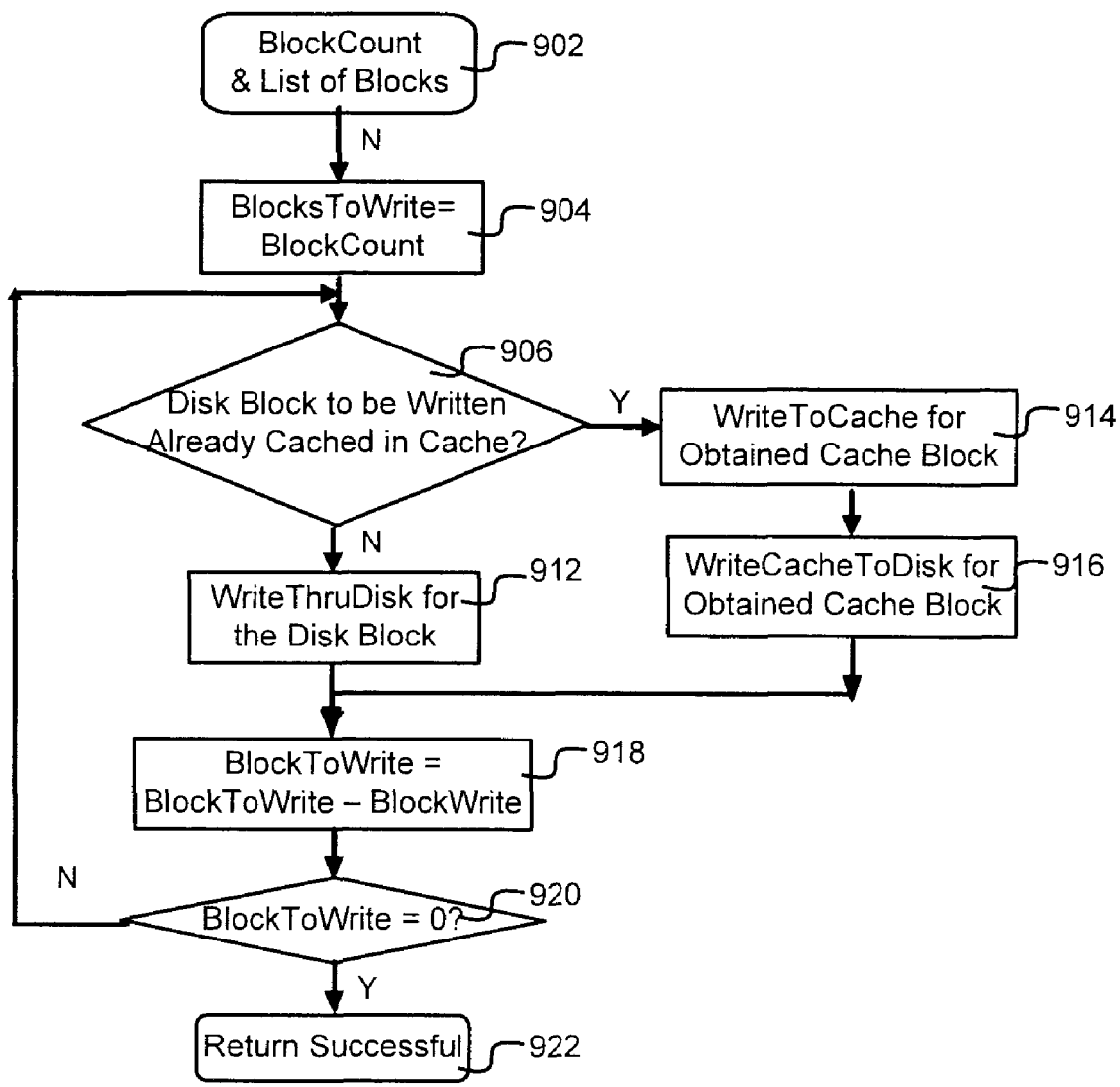
FIG. 9 illustrates an embodiment of a method that may be used to write data or any other information to a hard disk bypassing a cache.

Referring to FIG. 9, it is illustrated an embodiment of a method that may be used by cache management module 422 to write data to hard disks 220, 230 and/or 240 and may bypass the logical flash memory cache 250, e.g., based on a WriteThruBlock instruction from disk access module 410. The descriptions on boxes 902, 904, 906 may refer to the descriptions on boxes 802, 804, 806, respectively. For example, in block 902, cache management module 422 may obtain a list of blocks of data to be written to hard disks 220, 230 and/or 240 based on the WriteThruBlock instruction. A number of blocks in the list may be represented by Block-Count. In diamond 906, cache management module 422 may determine if a disk block to be written is cached in the logical flash memory cache 250 based on cached content table 440. In box 908, in response to determining that the disk block is cached in the logical flash memory cache 250, cache management module 422 may instruct cache access module 424 to write a block of data to be written to the cached disk block and to set a dirty flag of a cache block that corresponds to the disk block, e.g., by a WriteToCache instruction. In box 916, cache management module 422 may instruct cache access module 424 to write content in the cache block that is written in box 914 to the cached disk block and to clear out a dirty flag set in box 914, e.g., by a WriteCacheToDisk instruction. In contrast, in box 912, in response to determining that the disk block is not cached or absent in the logical flash memory cache 250, cache management module 422 may instruct cache access module 424 to write the block of data from cache management module 422 to the disk block, e.g., by a WriteThruDisk instruction. In one embodiment, cache access module 424 may bypass the logical flash memory cache 250 to access the disk block directly.

In box 918, cache management module 422 may let BlockToWrite=BlockToWrite–a number (e.g., which may be represented by BlockWrite) of blocks that have been written in boxes 912 and 914. In diamond 920, cache management module 422 may determine if BlockToWrite=0. In box 922, cache management module 422 may return e.g., "successful" or any other indicator, in response to determining that BlockToWrite equals to zero. In contrast, in response to determining that BlockToWrite is bigger than zero or does not equal to zero, the flow may return to diamond 906.

In one embodiment, cache management module 422 may execute a FlushCache instruction in response to a dirty cache block of the logical flash memory cache 250 being found. For example, for the FlushCache instruction, cache management module 422 may call a WriteCahceToDisk instruction. In response to receiving the WriteCahceToDisk instruction, cache access module 422 may write a dirty cache block to a disk block that corresponds to the dirty cache block based on cached content table 440 and clear out a dirty flag of the cache block. In another embodiment, the cache access module 424 may execute, e.g., a InitCacheList instruction to check inventory of one or more available caches and may build a cache mapping list 450 in response to a request from a processor such as system bootup. In another embodiment, in asynchronous mode, cache access module 424 may execute a QueryCommandStatus instruction to return a status that may indicate completeness of one or more instructions such as instructions to the cache management module 422.

While the methods of FIGS. 5-9 are illustrated as a sequence of operations, the illustrated operations may be performed in a different order in other embodiments. For example, while FIGS. 5-9 illustrate boxes 520, 522, 616, 618, 712, 714, 814, 816, 918, 920, respectively; however, in some embodiments, the boxes may be omitted. In another embodiment, one or more hard disk interface commands or instructions may be used to execute one or more instructions such as ReadThroughDisk, ReadDiskToCache, WrtieThruDisk, WriteCacheToDisk. In another embodiment, control logic 210 and/or access disk access module 410, cache management module 422 or cache access module 424 may be implemented in hardware, software, and/or firmware or any combination thereof.

In another embodiment, the cached content table 440 may be updated in response to a cache block being written. In some embodiments, the flow of FIG. 6 may proceed to box 610 in response to determining that BlockToRead is not equal to zero in diamond 618. Similarly, the flow of FIG. 8 may proceed from diamond 816 to box 810 or the flow of FIG. 9 may proceed from diamond 920 to box 914, if BlockToWrite is not equal to zero. In another embodiment, the flow of FIG. 7 may proceed to diamond 706 if BlockToRead is not equal to zero in diamond 714. While FIG. 4 illustrates control logic 210 to comprise cache management module 422 and cache access module 424, in some embodiments, the functions of control logic 210 may be implemented in one or more blocks and distributed among the blocks. While FIG. 4 illustrates to comprise two hybrid hard disks, a normal hard disk and a flash memory, in some embodiments, a hybrid hard disk may share a non-volatile memory device in the hybrid hard disk with a storage device. In another embodiment, two hybrid hard disks may share a non-volatile memory device in each hybrid hard disk with each other. In yet another embodiment, two non-volatile memory devices may form a logical non-volatile memory device that can be used to store content on a storage device. In yet another embodiment, a first non-volatile memory device and a second non-volatile memory device in a hybrid hard disk may form a logical non-volatile memory device that can be used to store content on the hybrid hard disk.

While certain features of the invention have been described with reference to embodiments, the description is not intended to be construed in a limiting sense. Various modifications of the embodiments, as well as other embodiments of the invention, which are apparent to persons skilled in the art to which the invention pertains are deemed to lie within the spirit and scope of the invention.

What is claimed is:

1. A system, comprising:
    a processor;
    a first storage device that comprises a first hard disk and a first non-volatile memory device;
    a second non-volatile memory device;
    a second storage device, wherein the second non-volatile memory device is provided on the second storage device that comprises a second hybrid hard disk;
    a control logic that couples to the processor to control the first non-volatile memory device and the second non-volatile memory device to form a logical non-volatile memory device, to convert data from at least one of the first hard disk and the second storage device into logical data and to store the logical data in the logical non-volatile memory device, the control logic controls to share the logical non-volatile memory device among the first storage device and the second storage device.

2. The system of claim 1, wherein:
    the first storage device comprises a first hybrid hard disk,
    the control logic to reserve on the first hybrid hard disk a space that corresponds to the first non-volatile memory device and to use a space access instruction to access the first non-volatile memory device.

3. The system of claim 1, wherein:
    the control logic comprises a first control module to determine whether content of the first hard disk is stored in the logical non-volatile memory device in response to a hard disk access instruction from the processor and a second control module to access the logical non-volatile memory device in response to the first control module determining that the content of the first hard disk is stored in the logical non-volatile memory device.

4. The system of claim 1, wherein:
The second non-volatile memory device is provided on none of the first storage device and the second storage device.

5. The system of claim 4, wherein:
in response to a hard disk accessing instruction from the processor, the control logic to determine if a disk block of the first hard disk to be accessed is stored in a cache block of the logical non-volatile memory device and to access a corresponding block of the first non-volatile memory device or the second non-volatile memory device based on a first table that indicates correspondence between the logical non-volatile memory device and the first non-volatile memory device and the second non-volatile memory device.

6. A method, comprising:
providing a first hybrid storage device that comprises a first hard disk and a first non-volatile memory device;
providing a second hybrid storage device that comprises a second hard disk and a second non-volatile memory device;
forming the first non-volatile memory device and the second non-volatile memory device to a logical non-volatile memory device to store logical data that is converted from data of at least one of the first hard disk and the second hard disk into logical data.

7. The method of claim 6, wherein in response to a first hard disk accessing instruction to access a block of the first hard disk, accessing a cache block of the logical non-volatile memory device that corresponds to a cache block of the second non-volatile memory device in the event that a content of the block of the first hard disk being stored in the corresponding cache block of the second non-volatile memory device.

8. The method of claim 6, comprising:
in response to a first hard disk writing instruction to write a disk block of the first hard disk, allocating a cache block of the logical non-volatile memory device to the disk block of the first hard disk in the event that a content of the disk block to be written is absent in the cache block of the logical non-volatile memory device,
writing the content to a corresponding cache block of the first or the second non-volatile memory device that corresponds to the allocated cache block of the logical non-volatile memory device.

9. The method of claim 6, comprising:
in response to a first hard disk reading instruction to read a disk block of the first hard disk, allocating a cache block of the logical non-volatile memory device to the disk block in the event that a content of the disk block is absent in the cache block of the logical non-volatile memory device,
reading the content of the disk block to the allocated cache block of the logical non-volatile memory device,
accessing the allocated cache block to read the content.

10. The method of claim 6, wherein:
mapping each cache block in the first non-volatile memory device and the second non-volatile memory device to a corresponding cache block in the logical non-volatile memory device to share the first non-volatile memory device and the second non-volatile memory device among the first hybrid hard disk and the second hybrid hard disk.

11. The method of claim 8, comprising:
updating a second table to indicate that the content of the disk block is stored in the cache block of the logical non-volatile memory device in response to the corresponding cache block being written.

12. A machine readable storage medium comprising a plurality of instructions that in response to being executed result in a computing device
providing a first hybrid storage device that comprises a first hard disk and a first non-volatile memory device;
providing a second hybrid storage device that comprises a second hard disk and a second non-volatile memory device;
forming the first non-volatile memory device and the second non-volatile memory device to a logical non-volatile memory device to store logical data that is converted from data of at least one of the first hard disk and the second hard disk into logical data.

13. The machine readable storage medium of claim 12, further comprising a plurality of instructions that in response to being executed result in a computing device
in response to a first hard disk reading instruction to read a disk block of the first hard disk, allocating a cache block of the logical non-volatile device to the disk block of the first hard disk in the event that a content of the disk block is absent in the cache block of the logical non-volatile memory device,
reading the content of the disk block to the allocated cache block of the logical non-volatile memory device, and
accessing the allocated cache block to read the content.

14. The machine readable storage medium of claim 12, the machine readable medium further comprising a plurality of instructions that in response to being executed result in a computing device
releasing a cache block of the logical non-volatile memory device to store the content of a disk block of the hard disk.

15. The machine readable storage medium of claim 12, further comprising a plurality of instructions that in response to being executed result in a computing device
in response to a first hard disk writing instruction to write a disk block of the first hard disk, writing a content comprised in the instruction to a cache block of the logical non-volatile memory device in response to determining that a disk block of the first hard disk is cached in the cache block of the logical non-volatile memory device,
writing the content of the cache block to the disk block of the first hard disk.

* * * * *